United States Patent
Lele et al.

(10) Patent No.: US 8,345,791 B2
(45) Date of Patent: Jan. 1, 2013

(54) METHODS FOR TRANSMITTING AND RECEIVING A MULTICARRIER SIGNAL COMPRISING ISOLATED PILOTS, CORRESPONDING DEVICES AND COMPUTER PROGRAM PRODUCTS

(75) Inventors: Chrislin Lele, Rennes (FR); Jean-Philippe Javaudin, Rennes (FR); Pierre Siohan, Rennes (FR)

(73) Assignee: France Telecom, Paris (FR)

( * ) Notice: Subject to any disclaimer, the term of this patent is extended or adjusted under 35 U.S.C. 154(b) by 827 days.

(21) Appl. No.: 12/373,494

(22) PCT Filed: Jul. 11, 2007

(86) PCT No.: PCT/FR2007/051640
§ 371 (c)(1),
(2), (4) Date: May 14, 2009

(87) PCT Pub. No.: WO2008/007020
PCT Pub. Date: Jan. 17, 2008

(65) Prior Publication Data
US 2009/0316810 A1    Dec. 24, 2009

(30) Foreign Application Priority Data
Jul. 12, 2006 (FR) .................................. 06 06379

(51) Int. Cl.
*H04K 1/10* (2006.01)
(52) U.S. Cl. ........ 375/295; 375/260; 375/262; 375/267; 375/340; 375/343; 375/146; 375/147; 375/149; 375/150

(58) Field of Classification Search .................. 375/260, 375/295, 267, 146, 147, 262, 340, 346, 347; 370/203, 204, 205, 208, 209, 210
See application file for complete search history.

(56) References Cited

U.S. PATENT DOCUMENTS

| | | | |
|---|---|---|---|
| 7,292,642 B2 | 11/2007 | Gonzalez et al. | |
| 7,577,087 B2 * | 8/2009 | Palin | 370/210 |
| 2004/0062191 A1 * | 4/2004 | Lacroix-Penther et al. | 370/206 |
| 2007/0183517 A1 * | 8/2007 | Liu et al. | 375/260 |

FOREIGN PATENT DOCUMENTS

| | | |
|---|---|---|
| EP | 1608094 | 12/2005 |
| FR | 2831359 | 4/2003 |

(Continued)

OTHER PUBLICATIONS

French Search Report from counterpart foreign Application No. FR 2 831 359 filed Apr. 25, 2003.

(Continued)

*Primary Examiner* — Dhaval Patel
(74) *Attorney, Agent, or Firm* — David D. Brush; Westman, Champlin & Kelly, P.A.

(57) ABSTRACT

A method is provided for receiving a received signal corresponding to a multicarrier signal transmitted by at least one transmitter via a transmission channel, the multicarrier signal being formed by a temporal succession of symbols including of a set of data elements with real values, including informative data elements, and reference data elements called pilots for at least some of the symbols. The reception method includes step of first estimation of the transmission channel. Due to at least one of the pilots being an isolated pilot in transmission, the reception method further includes a step of extracting the isolated pilot, and a step of locally refining the first estimation.

14 Claims, 3 Drawing Sheets

FOREIGN PATENT DOCUMENTS

WO 02/25884 3/2002

OTHER PUBLICATIONS

European Search Report from counterpart foreign Application No. EP 1608 094 filed Dec. 21, 2005.

International Search Report from counterpart foreign Application No. PCT/FR2007/051640 filed Jul. 11, 2007.

International Preliminary Report on Patentability and Written Opinion from counterpart foreign Application No. PCT/FR2007/05164.

Javaudin P. et al, Pilot-aided channel estimation for OFDM/OQAM. 2003-Spring. The 57th IEEE Semiannual Vehiclular Technlogy Conference—Proceedings Jeju, Korea, Apr. 22-25, 2003, IEEE Vehicular Technology Conference New York, NY: IEEE, US, vol. 4 of 4, Conf 57—Apr. 22, 2003.

* cited by examiner

METHODS FOR TRANSMITTING AND RECEIVING A MULTICARRIER SIGNAL COMPRISING ISOLATED PILOTS, CORRESPONDING DEVICES AND COMPUTER PROGRAM PRODUCTS

CROSS-REFERENCE TO RELATED APPLICATIONS

This Application is a Section 371 National Stage Application of International Application No. PCT/FR2007/051640, filed Jul. 11, 2007 and published as WO 2008/007020 on Jan. 17, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the transmission and broadcasting of digital information, especially at high bit rates, on a limited frequency band.

More specifically, the disclosure pertains to a technique for sending and receiving a multicarrier signal through which an estimation of the transmission channel, for example in a radiomobile environment, can be obtained in reception.

The technique of the disclosure is particular well suited to the transmission of multicarrier signals that have undergone an OFDM/OQAM (Orthogonal Frequency Divisional Multiplexing/Offset Quadrature Amplitude Modulation) type of modulation or a BFDM/OQAM (Biorthogonal Frequency Division Multiplexing/OQAM) type modulation for which the carriers are shaped by a prototype function.

BACKGROUND OF THE DISCLOSURE

1. Multicarrier Modulations
1.1 OFDM Modulations

OFDM (Orthogonal Frequency Divisional Multiplex) type multicarrier modulations are known today. A modulation technique of this kind brings an efficient solution to the problem of the broadcasting information, especially for wired or wireless multiple-path channels.

Consequently, the OFDM multicarrier modulation technique has been chosen in several standards and specifications for applications in wired transmission, for example ADSL (Asymmetric Digital Subscriber Line) or PLC (Power Line Communication) or wireless transmission applications, for example systems of the DAB (Digital Audio Broadcasting), DVB-T (Digital Video Broadcasting-Terrestrial) or WLAN (Wireless Local Area Network) type.

However, the rectangular shaping of a signal made by an OFDM modulator has the drawback of poor frequency location.

Consequently, alternative solutions have been proposed, leading to the creation of multicarrier modulation systems in which the signal is shaped by functions known as prototype functions, enabling better frequency location to be obtained.

Indeed, the set of carriers of a multicarrier modulation forms a multiplex and each of the carriers of this multiplex can be shaped by means of a same prototype function, referenced g(t), which characterizes the multicarrier modulation.

1.2 OFDM/OQAM Modulations

Thus, one solution proposed consists in replacing a QAM (Quadrature Amplitude Modulation) implemented on each of the carriers by a modulation which offsets the real and imaginary parts of the complex symbols to be transmitted by a half symbol time, for two successive carrier frequencies.

This alternation leads to an OFDM/OQAM type multicarrier modulation. This approach makes it possible especially to obtain the desired conditions of orthogonality with prototype filters that are not necessarily rectangular in shape.

Indeed, the temporal offset introduced by OQAM modulation relaxes the constraints of orthogonality and more generally those of biorthogonality. This class of modulation thus offers a wider choice of prototype functions than the simple rectangular prototype function of an OFDM modulation.

Thus, depending on the type of transmission channel considered for a given application, for example the radiomobile or powerline communication (PLC) channel, it is possible to choose prototype functions appropriate to the types of distortion encountered. In particular, it is preferable to choose prototype functions showing higher frequency selectivity than the cardinal sine used in OFDM modulation, especially in radiomobile channels, to overcome the frequency dispersion due to the Doppler effect or in a PLC channel to withstand narrow-band noise phenomena with greater efficiency and generally to meet the frequency specifications of transmission masks with greater ease.

OFDM/OQAM modulation is therefore an alternative to classic OFDM modulation, relying on a judicious choice of the prototype function modulating each of the carriers of the signal which need to be well located in the time/frequency space.

In particular, FIG. 1 illustrates a time/frequency representation of the real-value data elements transmitted by OFDM/OQAM modulation and of the complex-value data elements transmitted by classic OFDM modulation without any guard interval, an OFDM/QAM complex value symbol or OFDM/OQAM real value symbol being formed by a set of data elements at a given point in time t. Furthermore, each time/frequency location bears a carrier frequency, called a sub-carrier or directly a carrier here below in the description.

In this FIG. 1, the triangles at a given point in time t represent the complex-value data elements of an OFDM/QAM symbol. The circles and asterisks shown at a given point in time t for their part represent the real-value data elements of an OFDM/OQAM symbol. For example, for two successive real-value OFDM/OQAM symbols, the circles correspond to the real part and the asterisks to the imaginary part of a complex symbol coming from a QAM constellation which it is sought to transmit by using an OFDM/OQAM modulation.

Indeed, for a complex type of classic OFDM modulation, the real and imaginary parts of a complex value coming from the QAM constellation are transmitted simultaneously, at intervals of every symbol time period $T_u$; however, in a real type of OFDM/OQAM modulation, the real and imaginary parts are transmitted with a temporal offset of one complex half symbol time ($T_u/2$).

It can be seen in FIG. 1 that the spectral efficiency of the OFDM/OQAM is identical to that of classic OFDM without any guard interval. Indeed, if $v_0$ denotes the spacing between two adjacent carriers of the multiplex and $\tau_0$ denotes the temporal spacing between two real-value symbols, the following are transmitted for a same inter-carrier spacing $v_0$:

in OFDM/OQAM, one real value per carrier at every time slot $\tau_0$;

in classic OFDM without guard interval, one complex value (i.e. two real values) every $2 \times \tau_0 = T_u$.

In other words, the spectral efficiency of OFDM/OQAM is $(T_g+2\tau_0)/2\tau_0$ times greater than that of classic OFDM with a guard interval of a duration $T_g$.

1.3 BFDM/OQAM Modulation

Furthermore, if we choose to have demodulation functions on the reception side that are not necessarily the conjugate functions of the prototype functions used in transmission, it is possible by using the property of biorthogonality, to generalize OFDM/OQAM to the BFDM/OQAM modulation technique.

The offset principle, related to the OQAM family is strictly identical in the context of a BFDM/OQAM type modulation. Consequently, FIG. 1 can also be applied to BFDM/OQAM type modulations.

More specifically, the value of BFDM/OQAM type modulation is that, for a given length of prototype filter, it enables a reduction in the delay due to the transmission system.

As indicated here above, the BFDM/OQAM modulation technique, just like the OFDM/OQAM modulation technique, transmits real-valued symbols at a rate that is twice the rate at which the OFDM transmits complex-value symbols. Consequently, these two modulations have in principle the same spectral efficiency.

More specifically, the BFDM/OQAM signal can be represented in baseband in the following form:

$$s(t) = \sum_{n} \sum_{m=0}^{M-1} a_{m,n} \underbrace{g(t-n\tau_0)e^{j2\pi m v_0 t}e^{j\phi_{m,n}}}_{g_{m,n}(t)}, \quad (1)$$

with:

$a_{m,n}$ the real data elements to be transmitted on a carrier m at the instant n;

M the number of carrier frequencies (necessarily an even number);

g the prototype function used by the modulator;

$\tau_0$ the duration of a BFDM/OQAM symbol;

$v_0$ the inter-carrier spacing;

$\phi_{m,n}$ is a phase term chosen so as to obtain a real part/ imaginary part alternation enabling the orthogonality or more generally biorthogonality to be obtained.

Indeed, in the biorthogonal case, the demodulation base at reception may be different from that of transmission, and can be expressed in the following form:

$$f_{m,n}(t) = f(t-n\tau_0)e^{j2\pi m v_0 t}e^{j\phi_{m,n}} \quad (2)$$

The condition of biorthogonality can then be expressed in the following form:

$$\langle g_{m,n}, f_{m',n'} \rangle_R = \Re \left\{ \int_{-\infty}^{\infty} g_{m,n}(t) f_{m',n'}^*(t) dt \right\} = \delta_{m,m'} \delta_{n,n'} \quad (3)$$

where: $\langle .,. \rangle_R$ designates the real scalar product and $\Re\{\}$ designates the real part.

However, one drawback of BFDM/OQAM (or OFDM/OQAM) type modulation techniques is that the condition of biorthogonality (or orthogonality) is obtained only for real values of symbols to be transmitted. This raises a problem of estimation at reception, and especially of estimation of the transmission channel, in as much as the symbols received are complex symbols.

2. The Transmission Channel

Here below, a brief description is given of the characteristics of a transmission channel, especially in a radiomobile environment, and of the techniques of estimation of such a channel. It may be recalled indeed that the method for shaping an electrical signal from the information to be transmitted depends on the conditions in which such a signal is transmitted.

2.1 Characteristics of the Transmission Channel

In a radiomobile environment, the transmitted wave, in its journey, undergoes numerous reflections and the receiver therefore receives a sum of delayed versions of the sent signal. Each of these versions is attenuated and phase shifted randomly. This phenomenon known as "delay spread" generates inter-symbol interference (ISI). The term ISI is understood to mean especially interference between temporal symbols and/or between carriers. For example, in an urban type of environment, the delay spread is in the range of some microseconds or less.

Since the receiver (for example a motorist's mobile radio telephone) is assumed to be moving, the effect known as the Doppler effect also acts on each path, resulting in a shift in the frequency of the received spectrum that is proportional to the speed of movement of the mobile.

The combined action of these effects is expressed in the form of a non-stationary channel having profound fading effects at certain frequencies. A channel of this kind is qualified especially as a frequency-selective channel. In certain applications, which are particularly worthwhile in the context of the present invention, the transmission band has a width greater than that of the coherent band of the channel (i.e. the band for which the frequency response of the channel may be considered to be constant over a given period of time). Fading phenomena therefore appear in the band, i.e. at a given point in time, certain frequencies are highly attenuated.

To overcome these different phenomena (due to the ISI and to the Doppler effect), it has been envisaged in OFDM type systems to add a guard interval during which no payload information is transmitted so as to ensure that all the pieces of information received come from a same symbol. In the case of a consistent demodulation of sub-carriers, the distortion given by the channel is then corrected by estimating its value at every point of the time/frequency network.

The introduction of a guard interval of this kind thus reduces the phenomena related to inter-symbol interference.

However, one major drawback of this technique is that its spectral efficiency is limited since no payload information is transmitted during the guard interval.

On the other hand, OFDM/OQAM and BFDM/OQAM type modulation techniques do not necessitate the introduction of a guard interval or a cyclic prefix, while at the same time having the same spectral efficiency as classic OFDM modulation.

2.2 Estimation of the Transmission Channel

The distinct features of real type multicarrier modulations on the one hand and complex type multicarrier modulations on the other hand give rise to different types of processing when an estimation of the transmission channel is performed.

Here below, a detailed description is given of a technique for estimating the transmission channel for real type modulations, for example OFDM/OQAM or BFDM/OQAM type modulations. Indeed, in the case of a real type of multicarrier modulation, the fact of having an orthogonality of the translated values in the real sense makes the channel estimation process more difficult.

Indeed, to estimate the complex gain of the channel on a given sub-carrier, it would be appropriate to carry out the complex projection of the received signal on the sub-carrier considered. Now, the orthogonality of the translated values in the real sense and the fact that the prototype functions, even those chosen to be localized to the utmost extent in time and in frequency, have an infinite support on at least one of the two axes namely the time axis or the frequency axis, implying that even on an ideal channel, (intrinsic) inter-carrier interference will be generated.

Indeed, the imaginary part of the projection of the signal received on the base of the translated values of the prototype function is not 0. A disturbance-causing term then appears and gets added to the demodulated signal, and has to be corrected before the channel estimation is done. It is therefore necessary to design methods to compensate for this loss of complex orthogonality and thus mitigate at least some of the drawbacks of this prior-art technique for OFDM/OQAM or BFDM/OQAM type modulations.

Let us consider for example y(t) the signal received.

It is assumed especially that the choice of the parameters of the multicarrier modulation ensures that the channel may be considered to be flat on each of the sub-carriers for each OFDM/OQAM symbol. The channel can then be modeled by one complex coefficient per sub-carrier denoted $H_{m,n}$, where m is the index of the sub-carrier and n is the index of the OFDM/OQAM symbol.

We then use the complex projection of the multicarrier signal at the point $(m_0, n_0)$ of the time/frequency space to estimate the transmission channel $\hat{H}_{m_0,n_0}$ at this location.

Thus, if we send $a_{m_0,n_0} = \sqrt{E}$ at this location, we have:

$$\hat{H}_{m_0,n_0} = \frac{\int y(t) g^*_{m_0,n_0}(t) dt}{\sqrt{E}} \quad (4)$$

Assuming that the channel is ideal (y(t)=s(t)), given that the OFDM/OQAM and BFDM/OQAM modulations have only real orthogonality (equation (3)), we cannot have $\hat{H}_{m_0,n_0}=1$.

Therefore, taking $a^{(c)}_{m_0,n_0} = \langle s, g_{m_0,n_0} \rangle_C = \int s(t) g^*_{m_0,n_0}(t) dt$, and assuming that the channel is ideal, we have:

$$a^{(c)}_{m_0,n_0} + \sqrt{E} + \underbrace{\sum_{(m,n) \neq (m_0,n_0)} a_{m,n} \int g_{m,n}(t) g^*_{m_0,n_0}(t) dt}_{I_{m_0,n_0} \in j\Re} \quad (5)$$

where $\langle .,. \rangle$ designates the complex scalar product.

The equation (5) expresses the fact that the complex projection of the perfectly transmitted signal is nevertheless affected by an inter-symbol interference (ISI) intrinsic to the OFDM/OQAM and BFDM/OQAM modulations denoted as $I_{m_0,n_0}$.

In particular, the existence of this inter-symbol interference greatly disturbs the estimation of the transmission channel and therefore the estimation of the symbols.

One solution to this problem has been proposed especially in the patent document WO 02/25884 published on 28 Mar. 2002.

More specifically, the technique proposed in this document enables this interference to be limited by using a specific framing of the data at transmission. Thus, with 3×3 zones of the time/frequency network, called a first ring, or zones of greater size, this technique associates a reference data element called a pilot as well as a piece of control data.

One drawback of this prior-art technique is that it calls for a matrix computation at transmission and at reception, with a matrix size that increases with the size of the ring.

Another drawback of this prior-art technique can be seen in the case of a transmission for which the time/frequency resource is distributed among several users. In this case, the ring relationship requires that all the data elements of a same ring should be assigned to the same user. This constraint poses especially problems of granularity and of the allocation of resources, the number of pilots sent being generally situated between 2% and 5%.

There is therefore a need for a technique providing for a better estimation of the transmission channel and giving a more precise estimation of the informative data elements carried by the multicarrier signal.

SUMMARY

An aspect of the disclosure relates to a method for receiving a received signal corresponding to a multicarrier signal sent by at least one sender device through a transmission channel, said multicarrier signal being formed by a temporal succession of symbols formed by a set of data elements comprising:

informative data elements, and for at least certain of said symbols, reference data elements, called pilots, the value and location of which at transmission are known to at least one receiver designed to make a reception of said multicarrier signal, each of said data elements modulating a carrier frequency of said signal, a carrier frequency modulated by one of said data elements being called a carrier, said reception method comprising a step of first estimation of said transmission channel.

According to the invention, at least one of said pilots being an isolated pilot in transmission, whose direct neighbor carriers in the time/frequency space carry informative data elements, said reception method comprises:

a step for extracting said isolated pilot, delivering a complex value representing said isolated pilot, after passage through said transmission channel, a step for the local refining of said first estimation, taking account of said complex value of said pilot, delivering a refined local estimation of said transmission channel.

Thus, an embodiment of the invention relies on a novel and inventive approach to the estimation of the transmission channel in a transmission system implementing a multicarrier signal bearing real-value data elements. In particular, a multicarrier signal of this kind is of the OFDM/OQAM or BFDM/OQAM type.

More specifically, this technique relies on the implementation, on the reception side, of a first overall estimation of the transmission channel followed by a local refining of this first estimation, at the level of the isolated pilots, making it possible to obtain a finer estimation of the transmission channel. This technique therefore improves the estimation of the channel at the time/frequency locations of the isolated pilots.

The term "isolated pilot" is understood to mean especially a reference data element surrounded by informative data elements and not reference data elements, in other words a pilot for which the direct neighbor carriers in the time/frequency space carry informative data elements. In particular, these isolated pilots may be boosted.

It may also be recalled that the transmission channel is sub-divided into cells along the time and frequency axes. Each cell or location of the time/frequency space is assigned a dedicated carrier. The information to be conveyed is thus distributed over all these carriers.

In particular, this local refining operation enables an accurate estimation of the transmission channel at the level of the isolated pilot without wasting the time/frequency resources since it is not necessary to impose a constraint on the value of a data element borne by a carrier that is a direct neighbor (situated in a region called a first ring) of the isolated pilot. It is therefore not necessary to dictate a first-ring relationship to reduce the ISI.

Indeed, as compared with prior-art techniques, the technique of an embodiment of the invention can be used to optimize the time/frequency resource since it necessitates neither the use of a guard interval during which no payload information is transmitted, nor any specific framing of the data, associating a real pilot as well as a piece of control data, with a 3×3 zone of the time/frequency network (first ring), necessitating the reservation of two time/frequency locations.

The first estimation may especially be implemented by a classic channel estimation technique such as for example:
- an estimation by preamble, especially in the case of a transmission during which the channel varies slowly in time;
- an estimation by distributed pilots;
- an estimation by pairs of real pilots;
- an estimation by rings, as described especially in the above-mentioned patent document WO 02/25884;
- a blind estimation that does not rely on the use of reference data elements known to the receiver;
- etc.

In particular, the technique of estimation by pairs of real pilots relies on the fact of taking account, in a multiple carrier signal formed by a temporal succession of symbols constituted by a set of real-value data elements comprising informative data elements and for which, for at least certain symbols, pilots whose value and whose location at transmission are known to at least a receiver, of groups of pilots each localized in a neighborhood region of the time/frequency space.

More specifically, we consider at least one group of at least two real-value pilots located in a neighborhood region in which the transmission channel is considered to be roughly constant, so as to obtain an estimation of the transmission channel on this neighborhood region.

Thus, for at least one of the neighborhood regions, this estimation technique comprises:
- a step for extracting at least two complex values corresponding to the pilots of the group of the neighborhood region considered, after passage through the transmission channel,
- a step for estimating the real and imaginary parts of the transmission channel in the neighborhood region considered from its complex values.

According to one particular embodiment, the local refining step implements a comparison of an imaginary interference term affecting said isolated pilot and a local correction of said first estimation as a function of the result of said comparison.

In particular, said comparison compares:
- a deterministic interference affecting said isolated pilot, corresponding to the imaginary part of said complex value; and
- an estimated interference affecting said isolated pilot, determined from an estimation of at least one informative data element modulating a carrier that is a direct neighbor of said isolated pilot in the time/frequency space, obtained from said first estimation.

Indeed, a receiver designed to receive the multicarrier signal knows the real value of the isolated pilot sent. It is therefore easy to deduce the interference affecting an isolated pilot of this kind, this interference called a deterministic interference corresponding to the imaginary part of the complex value received representing the isolated pilot after passage through the transmission channel.

In comparing this deterministic interference with an interference estimated from the first estimation, the receiver can deduce a new estimation of the transmission channel at the location of the isolated pilot, called a refined local estimation.

Furthermore, this local refining step may take account of an ambiguity function of a prototype function associated, for example, with OFDM/OQAM or BFDM/OQAM modulation.

According to one alternative embodiment, the refined local estimation is assigned at least one piece of confidence information.

Thus, a greater degree of confidence is assigned to the estimation of the transmission channel at the locations in the time/frequency space carrying isolated pilots.

According to another aspect of an embodiment of the invention, the local refining step is reiterated at least once, a current local refining step taking account of the result of a preceding local refining step.

It is thus possible to improve the turbo-estimation loop in taking account of the values of the ambiguity function of the prototype function associated with the modulation and to obtain an improved turbo-equalisation improved through knowledge of the isolated pilots on the receiver side.

In particular, the current local refining step takes account of said piece of confidence information.

Again, according to another aspect of an embodiment of the invention, the first estimation step delivers a channel estimation for a region of the time/frequency space that is predetermined, and said region is sub-divided into at least two refining sub-regions each comprising a single isolated pilot, said local refining step being applied independently to each of said sub-regions.

Thus, for example, in the context of a highly disturbed region of the transmission channel, it is desirable to sub-divide this region into sub-regions and obtain a local refining in each of the sub-regions.

Another embodiment of the invention pertains to a device for receiving a received signal corresponding to a multicarrier signal as described here above, sent out by at least one sender through a transmission channel, said reception device comprising means of first estimation of the transmission channel.

According to an embodiment of the invention, at least one of said pilots being an isolated pilot in sending mode, said reception device comprises:
- means for extracting said isolated pilot, delivering a complex value representing said isolated pilot, after passage through said transmission channel,
- means for the local refining of said first estimation, taking account of said complex value of said pilot, delivering a refined local estimation of said transmission channel.

A reception device of this kind is adapted especially to implementing the receiving method described here above.

For example, a reception device of this kind corresponds to or is included in a terminal (radio telephone, laptop, PDA etc) or in a base station.

Another aspect of an embodiment of the invention concerns a method for sending a multicarrier signal formed by a temporal succession of symbols formed by a set of real-value data elements comprising:
    informative data elements, and
    for at least certain of said symbols, reference data elements called pilots whose value and location at sending are known to at least one receiver designed to perform a reception of said multicarrier signal,
each of said data elements modulating a carrier frequency of said signal, a carrier frequency modulated by one of said data elements being called a carrier.

According to an embodiment of the invention, a sending method of this kind uses at least two sets of data elements among said set of data elements, including:
    a first set used to determine a first estimation of a transmission channel between a sender designed to send said multicarrier signal and said receiver, and
    a second set comprising at least one isolated pilot whose direct neighbor carriers in the time/frequency space carry informative data elements enabling a local refining of said first estimation in taking account of a complex value associated with said isolated pilot after passage through said transmission channel.

More specifically, this technique relies on the implementation, on the sending side, of an isolated pilot i.e. a reference data element surrounded by informative data elements and not reference data elements in the time/frequency space.

On the reception side, it is thus possible to obtain a first estimation of the transmission channel from the first set of data elements comprising informative data elements and/or reference data elements, followed by a local refining of said estimation, at the level of the isolated pilots, from the second set, comprising isolated pilots (at least one of them).

Another embodiment of the invention also concerns a device for sending a multicarrier signal as described here above.

According to an embodiment of the invention, a sending device of this kind comprises means for implementing at least two sets of data elements among said set of data elements, including:
    a first set enabling the determining of a first estimation of a transmission channel between a first sender designed to send said multicarrier signal and said receiver, and
    a second set comprising at least one isolated pilot, enabling a local refining of said first estimation in taking account of a complex value associated with said isolated pilot after passage through said transmission channel.

A sender device of this kind is adapted especially to implementing the above-described sending method.

In particular, it is adapted to sending a multicarrier signal of this kind intended for the reception device described here above.

For example, a sender device of this kind corresponds to or is included in a terminal (radio telephone, laptop, PDA etc) or in a base station.

Yet another aspect of the invention concerns a computer program product downloadable from a communications network and/or stored on a computer-readable medium and/or executable by a processor comprising program code instructions for the implementation of the method for receiving as described here above and a computer program product downloadable from a communications network and/or stored on a computer-readable medium and/or executable by a processor comprising program code instructions for the implementation of the sending method as described here above.

Finally, another aspect of the invention concerns a multicarrier signal formed by a temporal succession of symbols formed by a set of real-value data elements comprising:
    informative data elements, and
    for at least certain of said symbols, reference data elements called pilots whose value and location at sending are known to at least one receiver designed to make a reception of said multicarrier signal,
each of said data elements modulating a carrier frequency of said signal, a carrier frequency modulated by one of said data elements being called a carrier.

According to an embodiment of the invention, said set of real-value data elements comprises:
    at least one first set of data elements enabling the determining of a first estimation of a transmission channel between a first sender designed to send said multicarrier signal and said receiver, and
    at least one second set of data elements comprising at least one isolated pilot whose direct neighbor carriers in the time/frequency space carry informative data elements, enabling a local refining of said first estimation in taking account of a complex value associated with said isolated pilot after passage through said transmission channel.

A signal such as this may especially represent a multicarrier signal sent according to the method for sending described here above. It may also be received according to the method for sending described here above.

BRIEF DESCRIPTION OF THE DRAWINGS

Other features and advantages shall appear more clearly from the following description of a preferred embodiment, given by way of a simple non-exhaustive and illustrative example, and from the appended drawings, of which.

DETAILED DESCRIPTION OF ILLUSTRATIVE EMBODIMENTS

1. Description of One Embodiment of the Invention

The general principle of an embodiment of the invention is based on the taking into account of isolated pilots in a multiple-carrier signal implementing real-value data elements so as to locally improve an estimation of the transmission channel between a sender and a receiver, at reception.

More specifically, an embodiment of the invention relies, in a particular embodiment, on the determining of a first estimation of the transmission channel implemented on the basis of a first channel-estimation technique, for example of the type estimation by preamble, by distributed pilots, by pairs of real pilots, by rings, blind estimation etc, followed by a local refining of this first estimation at the level of the different isolated pilots.

A description is given here below of a particular embodiment of the invention implemented in the context of an OFDM/OQAM type multicarrier modulation.

On the sending side, this embodiment entails the insertion, into the multicarrier signal, of the real-value isolated pilots, i.e. the reference data elements known to the receiver whose direct neighbor carriers (i.e. the first ring surrounding each isolated pilot) comprise solely informative data elements. In other words, an isolated pilot is transmitted on only one location of the time/frequency network having a density 2 of an OFDM/OQAM or BFDM/OQAM type modulation.

Figure 1:
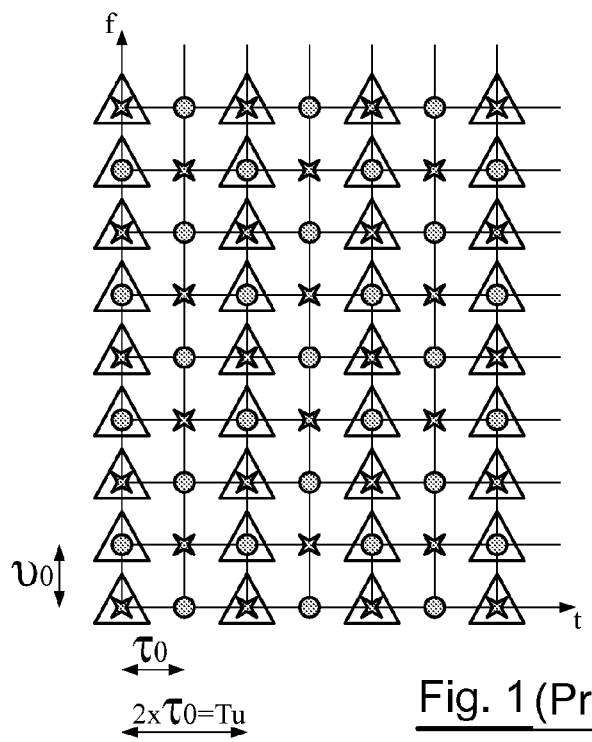
FIG. 1, already commented upon with reference to the prior art, is a time/frequency representation of the complex-value symbols transmitted according to a classic OFDM modulation and real-value symbols transmitted according to a prior art OFDM/OQAM modulation.
Figure 2:
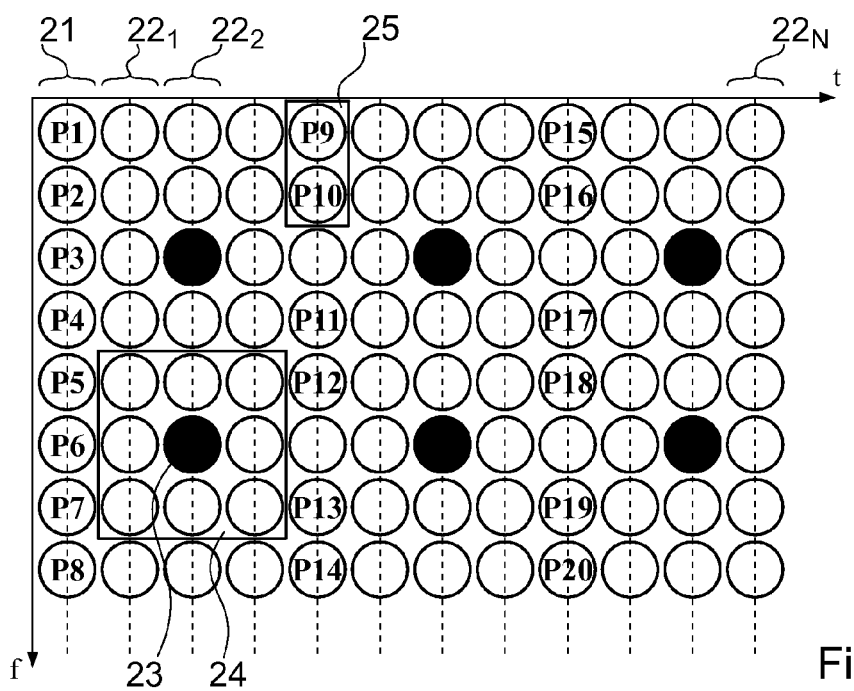
FIG. 2 illustrates the structure of a multicarrier signal according to one embodiment of the invention.

More specifically, as illustrated with reference to FIG. 2, we consider a multicarrier signal formed by a temporal succession of symbols $21_1, 22_1, 22_2, \ldots, 21_N$ formed by a set of real-value data elements comprising:
informative data elements corresponding to the empty, blank circles; and
in the case of at least some of said symbols, reference data elements called pilots corresponding to the black circles and to the blank circles annotated with the letter P known to at least one receiver designed for reception of the multicarrier signal.

More specifically, the blank circles annotated with the letter P are inserted into the multicarrier signal so as to enable a first estimation of the transmission channel at reception.

For example, at least one reference symbol 21 comprising the pilots P1 to P8 is inserted into the multicarrier signal at the start of a frame, a frame being formed by a set of at least one reference symbol called a preamble and a set of payload symbols $22_1$ to $22_N$ so as to enable a first estimation by preamble at reception.

According to one alternative embodiment, the pairs of real pilots P2n and P2n+1, for example the pair 25, are added to the multicarrier signal in place of the preamble 21 or jointly with the preamble 21, so as to enable a first estimation by pairs of real pilots, at reception.

In particular, the pair or pairs of pilots are located in a neighborhood region in which a transmission channel is considered to be non-variant. Thus, the pilots of these pairs are distributed in time and/or frequency depending on whether the channel is considered to be roughly constant in time and/or in frequency.

The black circles correspond to isolated pilots inserted into the data frame. For example, the ring 24 surrounding an isolated pilot 23 comprises solely blank circles, i.e. informative data elements.

These isolated pilots are inserted so as to enable a local refining of the first estimation of the transmission channel at the time/frequency locations of the isolated pilots.

These isolated pilots are inserted so as to enable a local refining of the first estimation of the transmission channel at the time/frequency locations of the isolated pilots.

Thus, the sending method implements at least two sets of data elements, the first set being used to determine a first estimation of the transmission channel comprising a preamble or pairs of real pilots according to this embodiment, and a second set used to locally improve the first estimation, comprising isolated pilots according to this embodiment.

Figure 3:
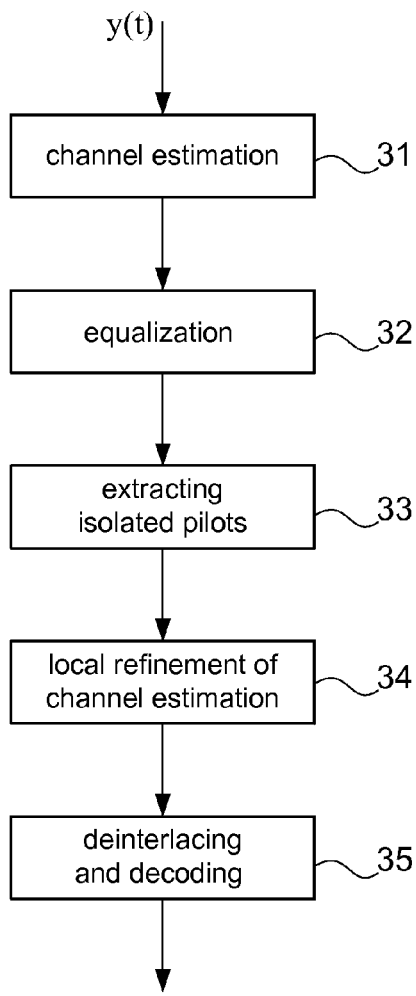
FIG. 3 presents the main steps of the reception method according to one embodiment of the invention.

On the reception side, as illustrated with reference to FIG. 3, a first estimation 31 of the transmission channel is made, on the basis of the received signal y(t), in implementing for example a first estimation by preamble or by pilots distributed followed by an interpolation.

Then, the signal received around the isolated pilots, i.e. at the time/frequency locations bearing informative data elements, is equalized 32.

In a following step 33, the isolated pilots are extracted. Thus, the complex values representing isolated pilots are obtained after passage through the transmission channel.

Then, a local refining 34 is made of the first estimation at the level of at least one isolated pilot. To this end, the following comparisons are made for an isolated pilot:
a deterministic interference affecting this isolated pilot, corresponding to the imaginary part of its complex value, and
an estimated interference affecting this isolated pilot determined from an estimation of the data elements surrounding this pilot (for example the informative data elements of the ring 24) which itself is determined from the first channel estimation.

Thus, a re-estimation of the transmission channel, also called a refined local estimation, is obtained at the time/frequency locations of the isolated pilots, by simple division according to this particular embodiment.

By combining these local refined estimations with the first estimation, we obtain an improved estimation of the transmission channel.

At the next step 35, it is possible to equalize the received signal on the basis of the improved estimation of the transmission channel, and then de-interlace and de-code this received signal.

Here below, an example is described of an implementation of the reception technique according to this particular embodiment of the invention, in the context of a BFDM/OQAM type modulation.

More specifically, the received signal y(t) can be written in the form:

$$y(t) = \sum_n \sum_{m=0}^{M-1} H_{m,n}^{(c)} a_{m,n} g_{m,n}(t) + b(t), \quad (6)$$

with $H^{(c)}_{m,n}$ being the complex coefficients representing the transmission channel at each time/frequency location with m the frequency index and n the time index and b(t) the noise component.

As already specified for the OFDM/OQAM type modulations, the sent signal and the transmission channel being modeled in baseband by complex numbers, the coefficient $a^{(c)}_{m_0,n_0}$ to be estimated at reception for each element $(m_0,n_0)$ of the time/frequency network is also a complex number.

Also assuming that the channel is approximately constant on a given region of the time/frequency space, owing to the biorthogonality of the pair of functions (f,g) described with reference to the equation (3), the signal received on the carrier $m_0$ at the instant $n_0$ is estimated by:

$$y^{(c)}_{m_0,n_0} = \langle s, f_{m_0,n_0} \rangle_C \quad (7)$$

$$y^{(c)}_{m_0,n_0} = H^{(c)}_{m_0,n_0} a_{m_0,n_0} +$$

$$H^{(c)}_{m_0,n_0} \underbrace{\left[ \sum_{(m,n) \neq (m_0,n_0)} a_{m,n} \int g_{m,n}(t) f^*_{m_0,n_0}(t) dt \right]}_{C_{m_0,n_0}} + D_{m_0,n_0} + b_{m_0 n_0}$$

In this expression the term $C_{m_0,n_0}$ is linked to the interference created in the region where the transmission channel is assumed to be constant and the term $D_{m_0,n_0}$ associated with the interference created in the regions where the transmission channel is no longer supposed to be constant.

Here below in the description, the noise component b is omitted and the term $D_{m_0,n_0}$ is overlooked so as to simplify the equations.

It is thus assumed that the received signal at any location (m,n) of the time/frequency network can be interpreted as the result of the product of a complex channel multiplied by a complex coefficient, i.e.:

$$y^{(c)}_{m,n} = H^{(c)}_{m,n} a^{(c)}_{m,n} = H^{(c)}_{m,n}(a^{(r)}_{m,n} + ja^{(i)}_{m,n}),$$

where $a^{(r)}_{m,n}$ and $a^{(i)}_{m,n}$ are real values (the exponent (r) indicates the real value of a complex value, and the exponent (i) indicates the imaginary part).

After a first estimation of the transmission channel 31, followed by an equalisation 32, we obtain a first estimation of the values carried by the data elements denoted $\tilde{a}^{(r)}_{m,n}$.

Knowing that this received signal can be written as $y^{(c)}_{m,n} = H^{(c)}_{m,n}(a^{(r)}_{m,n} + ja^{(i)}_{m,n})$, we can write $y^{(c)}_{m,n} = H^{(c)}_{m,n}(\tilde{a}^{(r)}_{m,n} + ja^{(i)}_{m,n})$ if the estimation of the data element is perfect. Now, at the isolated pilots extracted at the step 33, it may be recalled that the real values and the time/frequency locations of the isolated pilots are known to the receiver. The estimation is therefore perfect and the term $a^{(i)}_{m,n}$ is used to define a deterministic interference affecting the isolated pilot.

Assuming an isolated pilot to be positioned at the location (m,n), we can also define a region about this pilot, denoted $\Omega_{P,Q}$ such that:

$$\Omega_{P,Q} = \{(p,q), p=-P,K,P, q=-Q,K,Q\} - \{(0,0)\},$$

where the location of the coordinates (0,0) corresponds to the location (m,n).

Assuming a reliable estimation of the real values $a^{(r)}_{m_0+p,n_0+q}$, we determine an estimated interference affecting the isolated pilot.

It is then assumed that:

$$a^{(i)}_{m,n} \approx \sum_{p,q \in \Omega_{P,Q}} \Im\{\beta^{(m_0,n_0)}_{m_0+p,n_0+q}\} a^{(r)}_{m_0+p,n_0+q} \approx \sum_{p,q \in \Omega_{P,Q}} \Im\{\beta^{(m_0,n_0)}_{m_0+p,n_0+q}\} \tilde{a}^{(r)}_{m_0+p,n_0+q}$$

where $\beta_{p,q}$ is an expression whose real values depend on the functions g and f and the phase term $\phi_{m,n}$, and for which the main elements are presented in the appendix A which is an integral part of the present description and $\Im\{\beta^{(m,n)}_{m',n'}\}$ designates the imaginary part of $\beta^{(m,n)}_{m',n'}$.

At the end of the local refining step 34, the local estimation of the transmission channel at the location (m,n) is obtained by:

$$H^{(c)}_{m,n} = \frac{y^{(c)}_{m,n}}{\tilde{a}^{(r)}_{m,n} + ja^{(i)}_{m,n}}.$$

It can be seen that according to this embodiment the value of the estimation of the transmission channel at the level of the real pilots is very close to the true transmission channel inasmuch as the real value of the isolated pilot is known to the receiver.

As indicated here above, we can combine these local refined estimations with the first estimation to obtain an improved estimation of the transmission channel.

At the next step 35, it is also possible to equalize the received signal on the basis of the improved estimation of the transmission channel, de-interlace this signal and de-code it.

According to one alternative embodiment illustrated with reference to FIG. 4B, the local refining step is reiterated at least twice.

Figure 4A:
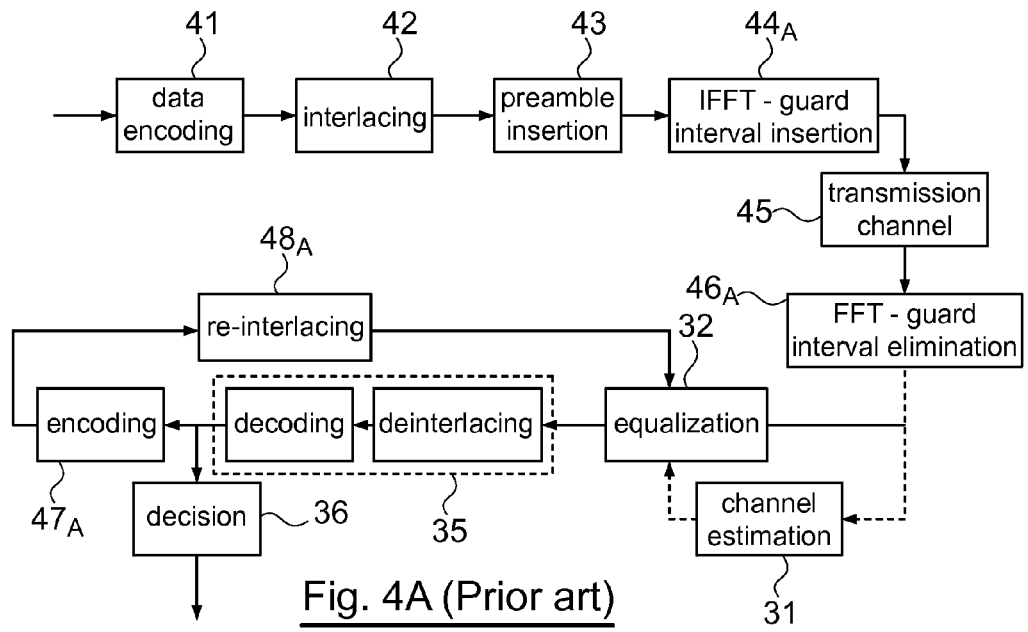
FIGS. 4A and 4B respectively illustrate a classic turbo-estimation scheme implemented for an OFDM type modulation and a turbo-estimation scheme according to an embodiment of the invention implemented for an OFDM/OQAM or BFDM/OQAM type modulation.
Figure 4B:
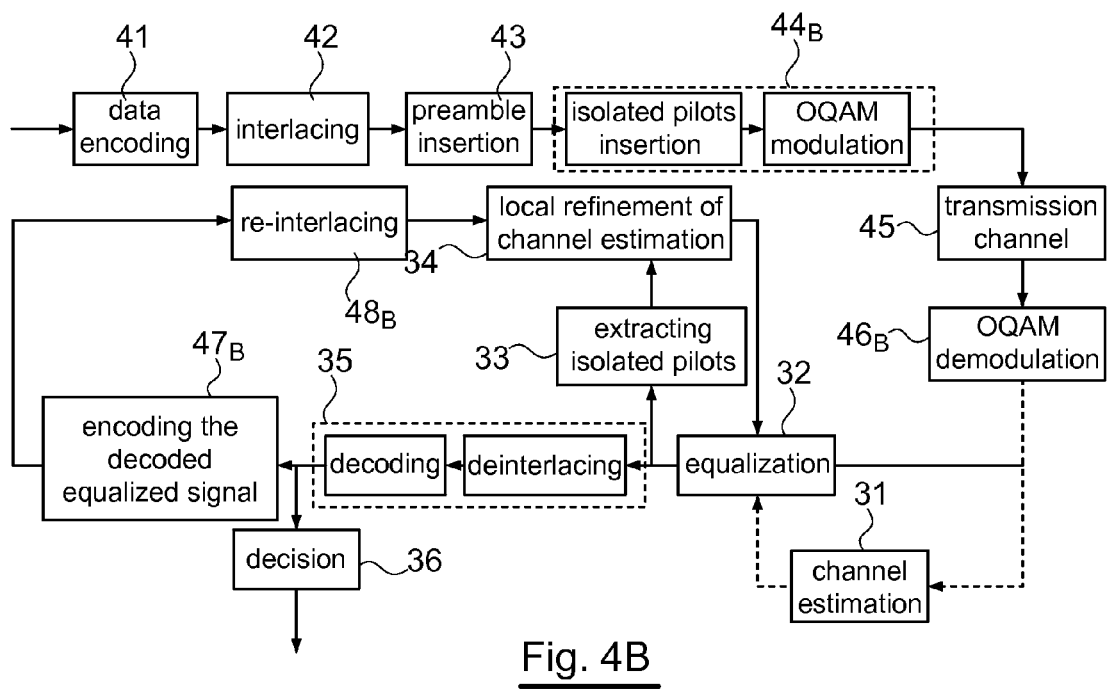

More specifically, FIGS. 4A and 4B respectively illustrate a classic turbo-estimation scheme implemented by an OFDM type modulation and a turbo-estimation scheme according to a particular embodiment of the invention implemented for an OFDM/OQAM or BFDM/OQAM type modulation.

On the sending side, it can be seen that the data encoding step 41, interlacing step 42, and preamble-insertion step 43 are identical in this particular embodiment of the invention.

In the context of a classic OFDM type modulation, an inverse Fourier transform (IFFT) is then applied and a guard interval $44_A$ is added thereto. However, in the context of an OQAM type modulation in this embodiment of the invention, a step is performed to insert isolated pilots followed by an OQAM modulation $44_B$.

The multicarrier signal is then sent in a transmission channel 45.

On the reception side, in the context of a classic OFDM type modulation, first of all a Fourier transform (FFT) is performed and it is then followed by an elimination of the guard interval $46_A$. Then, the classic steps of estimation of the channel 31, equalisation of the received signal 32 and de-interlacing and de-coding of the equalized signal 35 are performed, enabling a decision known as a hard decision 36 to be taken.

In the context of a turbo-estimation, the de-coded equalized signal is again encoded $47_A$, re-interlaced $48_A$, and again equalized 32 so as to refine the decision step 36.

In the context of an OFDM/OQAM type modulation or BFDM/OQAM type modulation, first of all an OQAM demodulation step $46_B$ is performed. Then, the above-described steps involving a first estimation of the channel 31, and equalisation of the received signal 32 and a de-interlacing and de-coding of the equalized signal 35 are performed enabling a hard decision 36 to be taken.

Furthermore, after the equalisation of the received signal 32, in this embodiment of the invention, isolated pilots 33 are extracted so as to locally refine the estimation of the transmission channel during the step 34.

It is possible especially to determine an improved estimation of the transmission channel on the basis of these local refined estimations in assigning if need be a piece of confidence information to the estimation of the channel corresponding to the time/frequency locations of the pilots.

In particular, in the context of a turbo-estimation operation, the de-coded equalized signal is again encoded $47_B$, re-interlaced $48_B$, and brought into play to improve the estimation of the transmission channel.

It is thus possible to improve the estimation of the values carried by the informative data elements by means of an iterative process.

Figures 5A, 5B:
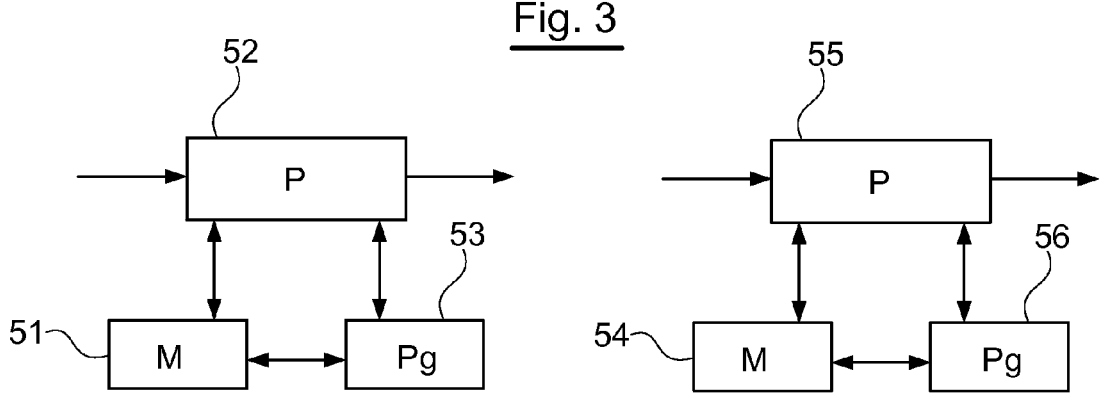
FIGS. 5A and 5B respectively present the structure of a sender device and a reception device according to one particular embodiment of the invention.

Referring now to FIGS. 5A and 5B, we present the simplified structures of a sending and receiving device according to the particular embodiment described here above.

As illustrated in FIG. 5A, a sending device of this kind comprises a memory 51, a processing unit 52 equipped for example with a microprocessor μP and driven by the computer program 53 implementing the sending method according to an embodiment of the invention.

At initialization, the code instructions of the computer program 53 are loaded for example into a RAM and then executed by the processor of the processing unit 52. At input, the processing unit 52 receives data to be transmitted in the form of informative data elements. The microprocessor of the processing unit 52 implements the steps of the sending method described here above so as to build a multicarrier signal comprising at least one first set of data elements that can be used to determine a first estimation of the transmission channel and at least one second set of data elements comprising at least one second set of data elements comprising at least one isolated pilot enabling a local refining of the first estimation. To this end, the sending device comprises means to implement both sets of data elements. These means are driven by the microprocessor of the processor unit 52.

The processing unit 52 outputs the above-mentioned multicarrier signal.

The receiving device illustrated in FIG. 5B comprises a memory 54, a processing unit 55 equipped for example with a microprocessor μP and driven by the computer program 56 implementing the receiving method according to an embodiment of the invention.

At initialization, the code instructions of the computer program 56 are loaded for example into a RAM and then executed by the processor of the processing unit 55. At input, the processing unit 55 receives a received multicarrier signal y(t). The microprocessor of the processing unit 55 implements the steps of the receiving method described here, according to the instructions of the computer program 56, to estimate the transmission channel and decode the data received. To this end, the receiving device comprises means for making a first estimation of the transmission channel and, for at least one isolated pilot, means for local refining of the first estimation, taking account of the complex value of the isolated pilot, delivering a refined local estimation of the transmission channel. These means are driven by the microprocessor of the processing unit 55.

2. Appendix

Computation of the Constants $\beta^{(m_0,n_0)}_{m_0+p,n_0+q}$ Related to the Base Modulation Functions and to the Phase Here below we present a method for computing the real constants $\beta^{(m_0,m_0)}_{m_0+p,n_0+q}$ such as:

$$\hat{a}^{(i)}_{m_0,n_0} \approx \sum_{p,q \in \Omega_{P,Q}} \Im\{\beta^{(m_0,n_0)}_{m_0+p,n_0+q}\} a^{(r)}_{m_0+p,n_0+q} \quad (15)$$

where $\Im\{\beta^{(m,n)}_{m',n'}\}$ designates the imaginary part of $\beta^{(m,n)}_{m',n'}$.

It may be recalled first of all that the multicarrier signal sent can be written in the form:

$$s(t) = \sum_n \sum_{m=0}^{M-1} \underbrace{a_{m,n} g(t-n\tau_0) e^{j2\pi m v_0 t} e^{j\phi_{m,n}}}_{g_{m,n}(t)} \quad (16)$$

If it is also assumed that the transmission channel is perfect, in taking it for example to be equal to (1), at least locally, the estimate of the transmitted coefficients is given by:

$$\hat{a}^{(c)}_{m,n} = \sum_{n',m'} \left[ \int f^*_{m,n}(t) g_{m',n'}(t) dt \right] a_{m',n'} \quad (17)$$

Assuming:

$$\beta^{(m,n)}_{m',n'} = \int f^*_{m,n}(t) g_{m',n'}(t) dt \quad (18),$$

we obtain, for the biorthogonal functions $f$ and $g$, $\Re\{\hat{a}^{(c)}_{m,n}\} = a_{m,n}$, giving:

$$\hat{a}^{(c)}_{m,n} = a^{(r)}_{m,n} + j\hat{a}^{(i)}_{m,n} \quad (19)$$

$$= a_{m,n} + j\Im\left\{\sum_{n',m'} \beta^{(m,n)}_{m',n'} a_{m',n'}\right\}$$

$$= a_{m,n} + j\sum_{n',m'} \Im\{\beta^{(m,n)}_{m',n'}\} a_{m',n'}$$

There therefore remains an interference term which can be evaluated for any pilot $(a_{m_0,n_0})$ in a neighborhood P×Q in evaluating $\beta_{m',n'}$.

It is also noted that:

$$\hat{a}^{(i)}_{m,n} = \sum_{n',m'} \Im\{\beta^{(m,n)}_{m',n'}\} a_{m',n'}. \quad (20)$$

Developing the expression of the base modulation functions and demodulation functions, we obtain:

$$\beta^{(m,n)}_{m',n'} = e^{j(\phi_{m',n'} - \phi_{m,n})} \int f^*(t-n\tau_0) g(t-n'\tau_0) e^{j2\pi(m'-m)v_0 t} dt \quad (21)$$

In a neighborhood P×Q of $(m_0,n_0)$, this equation can be re-written in taking $m=m_0$, $n=n_0$, $m'=m_0+p$ and $n'=n_0+q$, giving:

$$\beta^{(m_0,n_0)}_{m_0+p,n_0+q} = e^{j(\phi_{m_0+p,n_0+q} - \phi_{m_0,n_0})} \int f^*(t-n_0\tau_0) g(t-(n_0+p)\tau_0) e^{j2\pi p v_0 t} dt \quad (22)$$

$$\beta^{(m_0,n_0)}_{m_0+p,n_0+q} = (-1)^{n_0 p} e^{j(\phi_{m_0+p,n_0+q} - \phi_{m_0,n_0})} \int f^*(t-p\tau_0) g(t) e^{j2\pi p v_0 t} dt \quad (23)$$

It is therefore noted that the coefficients $\beta$ can be obtained from the cross ambiguity function of $f$ and $g$ in the biorthogonal case or from the ambiguity function of $g$ in the orthogonal case.

For its numerical evaluation, $f$ and $g$ being obtained with finite-length filters, this computation is more precise if it is done directly in discrete form:

$$\beta^{(m_0,n_0)}_{m_0+p,n_0+q} = \quad (24)$$

$$(-1)^{n_0 p} e^{j(\phi_{m_0+p,n_0+q} - \phi_{m_0,n_0})} \sum_k f^*[k] g[k-qN] e^{j\frac{2\pi}{2N} p\left(k-\frac{D}{2}\right)}$$

with D=aN−γ and M=2N.

For its implantation on the reception side of a trans-multiplexer, it is preferable to take account of the fact that these coefficients have to be applied in taking account of a delay of α samples.

Here below, we present two examples of the determining of the coefficients β, in the context of an OFDM/OQAM type modulation having a real and even-parity continuous prototype function.

1. Phase defined by $$\phi_{m,n} = \frac{\pi}{2}(n+m)$$

Assuming:

$$\phi_{m,n} = \frac{\pi}{2}(n+m), \quad (25)$$

the equation (22) becomes:

$$\beta_{m_0+p,n_0+q}^{(m_0,n_0)} = (-1)^{n_0 p} e^{j\frac{\pi}{2}(p+q)} \int g(t) g(t-q\tau_0) e^{j2\pi p v_0 t} dt. \quad (26)$$

We then introduce the ambiguity function of a function x with the notation used in the patent document WO 02/25884 mentioned here above:

$$A_x(\tau, v) = \int x\left(t+\frac{\tau}{2}\right) \cdot x^*\left(t-\frac{\tau}{2}\right) e^{-j2\pi v t} dt$$

In changing the variable $$t = t' + \frac{q\tau_0}{2} \text{ in the equation (26),}$$

we obtain:

$$\beta_{m_0+p,n_0+q}^{(m_0,n_0)} = (-1)^{n_0 p} e^{j\frac{\pi}{2}(p+q)} \int g\left(t+\frac{q\tau_0}{2}\right) g\left(t-\frac{q\tau_0}{2}\right) e^{j2\pi p v_0\left(t+\frac{q\tau_0}{2}\right)} dt$$

It being known that $$v_0 \tau_0 = \frac{1}{2},$$

the following is then obtained:

$$\beta_{m_0+p,n_0+q}^{(m_0,n_0)} = -(-1)^{n_0 p} e^{j\frac{\pi}{2}((p+q)+pq)} A(q\tau_0, pv_0).$$

Given that in this precise case, the function A is real, it is then possible to verify that the coefficient $\beta_{p,q}$ is a pure imaginary value.

2. Phase defined by $$\phi_{m,n} = \frac{\pi}{2}(n+m) + \pi nm$$

In performing the same computation as here above assuming $$\phi_{m,n} = \frac{\pi}{2}(n+m) + \pi nm,$$

we obtain:

$$\beta_{m_0+p,n_0+q}^{(m_0,n_0)} = -(-1)^{m_0 q+pq} e^{j\frac{\pi}{2}((p+q)+pq)} A(q\tau_0, pv_0)$$

Although the present disclosure has been described with reference to one or more examples, workers skilled in the art will recognize that changes may be made in form and detail without departing from the scope of the disclosure and/or the appended claims.

The invention claimed is:

1. Method for receiving a received signal corresponding to a multicarrier signal sent by at least one sender device through a transmission channel, said multicarrier signal being formed by a temporal succession of symbols formed by a set of data elements comprising:
 informative data elements, and
 for at least certain of said symbols, reference data elements called pilots whose value and location at transmission are known to at least one receiver designed to make a reception of said multicarrier signal,
each of said data elements modulating a carrier frequency of said signal, a carrier frequency modulated by one of said data elements being called a carrier, said reception method comprising:
 a step of first estimation of said transmission channel, wherein at least one of said pilots comprises an isolated pilot in transmission whose direct neighbor carriers in time/frequency space carry informative data elements,
 a step of extracting said isolated pilot, delivering a complex value representing said isolated pilot, after passage through said transmission channel,
 a step of local refining of said first estimation, taking account of said complex value of said pilot, delivering a refined local estimation of said transmission channel, wherein said local refining comprises comparing an imaginary interference term affecting said isolated pilot to a local correction of said first estimation as a function of the result of said comparison.

2. Method for receiving according to claim 1, wherein said comparison compares:
 a deterministic interference affecting said isolated pilot corresponding to the imaginary part of said complex value; and
 an estimated interference affecting said isolated pilot, determined from an estimation of at least one informative data element modulating a carrier that is a direct neighbor of said isolated pilot in the time/frequency space, obtained from said first estimation.

3. Method for receiving according to claim 1, wherein said refined local estimation is assigned at least one piece of confidence information.

4. Method for receiving according to claim 1, wherein said local refining step is reiterated at least once, a current local refining step taking account of the refined local estimation resulting from a preceding local refining step.

5. Method for receiving according to claim 4, wherein said refined local estimation is assigned at least one piece of confidence information and wherein said current local refining step also takes account of said piece of confidence information.

6. Method for receiving according to claim 1, wherein said first estimation step delivers a channel estimation for a region of the time/frequency space that is predetermined, and wherein said region is sub-divided into at least two refining sub-regions each comprising a single isolated pilot, said local refining step being applied independently to each of said sub-regions.

7. Device for receiving of a received signal corresponding to a multicarrier signal sent by at least one sender through a transmission channel, said multicarrier signal being formed by a temporal succession of symbols formed by a set of real-value data elements comprising:
 informative data elements, and
 for at least certain of said symbols, reference data elements called pilots whose value and location at transmission are known to said reception device designed to make a reception of said multicarrier signal, each of said data elements modulating a carrier frequency of said signal, a carrier frequency modulated by one of said data elements being called a carrier, said reception device comprising:

means of first estimation of the transmission channel, wherein at least one of said pilots comprises an isolated pilot at sending whose direct neighbor carriers in time/frequency space carry informative data elements, means for extracting said isolated pilot, delivering a complex value representing said isolated pilot, after passage through said transmission channel, means for local refining of said first estimation, taking account of said complex value of said pilot, delivering a refined local estimation of said transmission channel, wherein said local refining comprises comparing an imaginary interference term affecting said isolated pilot to a local correction of said first estimation as a function of the result of said comparison.

8. Computer program product stored on a non-transitory computer-readable medium and executable by a processor, wherein the product comprises program code instructions for implementing a method for receiving a received signal corresponding to a multicarrier signal sent by at least one sender device through a transmission channel, said multicarrier signal being formed by a temporal succession of symbols formed by a set of data elements comprising:

informative data elements, and for at least certain of said symbols, reference data elements called pilots whose value and location at transmission are known to at least one receiver designed to make a reception of said multicarrier signal, each of said data elements modulating a carrier frequency of said signal, a carrier frequency modulated by one of said data elements being called a carrier, said reception method comprising:

a step of first estimation of said transmission channel, wherein at least one of said pilots comprises an isolated pilot in transmission whose direct neighbor carriers in time/frequency space carry informative data elements, a step of extracting said isolated pilot, delivering a complex value representing said isolated pilot, after passage through said transmission channel, a step of local refining of said first estimation, taking account of said complex value of said pilot, delivering a refined local estimation of said transmission channel, wherein said local refining comprises comparing an imaginary interference term affecting said isolated pilot to a local correction of said first estimation as a function of the result of said comparison.

9. Method for sending a multicarrier signal formed by a temporal succession of symbols formed by a set of real-value data elements comprising:

informative data elements, and for at least certain of said symbols, reference data elements called pilots whose value and location at transmission are known to at least one receiver designed to make a reception of said multicarrier signal, each of said data elements modulating a carrier frequency of said signal, a carrier frequency modulated by one of said data elements being called a carrier, wherein the method implements at least two sets of data elements among said set of data elements, including:

a first set comprising a preamble formed by at least one symbol constituted by pilots, used to determine a first estimation of a transmission channel between a sender designed to send said multicarrier signal and said receiver, and a second set comprising at least one isolated pilot whose direct neighbor carriers in time/frequency space carry informative data elements enabling a local refining of said first estimation in taking account of a complex value associated with said isolated pilot after passage through said transmission channel, wherein said local refining implements a comparison of an imaginary interference term affecting said isolated pilot to a local correction of said first estimation as a function of the result of said comparison, and wherein the method further comprises transmitting the multicarrier signal by the sender.

10. Method for sending a multicarrier signal formed by a temporal succession of symbols constituted by a set of real-value data elements comprising:

informative data elements, and for at least certain of said symbols, reference data elements called pilots whose value and location at transmission are known to at least one receiver designed to make a reception of said multicarrier signal, each of said data elements modulating a carrier frequency of said signal, a carrier frequency modulated by one of said data elements being called a carrier, wherein the method implements at least two sets of data elements among said set of data elements, including:

a first set comprising at least one pair of pilots, used to determine a first estimation of a transmission channel between a sender designed to send said multicarrier signal and said receiver, and a second set comprising at least one isolated pilot whose direct neighbor carriers in time/frequency space carry informative data elements enabling a local refining of said first estimation in taking account of a complex value associated with said isolated pilot after passage through said transmission channel, wherein said local refining implements a comparison of an imaginary interference term affecting said isolated pilot to a local correction of said first estimation as a function of the result of said comparison, and wherein the method further comprises transmitting the multicarrier signal by the sender.

11. Device for sending a multicarrier signal formed by a temporal succession of symbols formed by a set of real-value data elements comprising:

informative data elements, and for at least certain of said symbols, reference data elements called pilots whose value and location at transmission are known to at least one receiver designed to make a reception of said multicarrier signal, each of said data elements modulating a carrier frequency of said signal, a carrier frequency modulated by one of said data elements being called a carrier, wherein the method comprises means for implementing at least two sets of data elements among said set of data elements, including:

a first set comprising a preamble formed by at least one symbol constituted by pilots, used to determine a first estimation of a transmission channel between a sender designed to send said multicarrier signal and said receiver, and a second set comprising at least one isolated pilot whose direct neighbor carriers in time/frequency space carry informative data elements enabling a local refining of said first estimation in taking account of a complex value associated with said isolated pilot after passage through said transmission channel, wherein said local refining implements a comparison of an imaginary interference term affecting said isolated pilot to a local correction of said first estimation as a function of the result of said comparison.

12. Device for sending a multicarrier signal formed by a temporal succession of symbols formed by a set of real-value data elements comprising:
   informative data elements, and
   for at least certain of said symbols, reference data elements called pilots whose value and location at transmission are known to at least one receiver designed to make a reception of said multicarrier signal,
each of said data elements modulating a carrier frequency of said signal, a carrier frequency modulated by one of said data elements being called a carrier, wherein the method comprises means for implementing at least two sets of data elements among said set of data elements, including:
   a first set comprising at least one pair of pilots, used to determine a first estimation of a transmission channel between a sender designed to send said multicarrier signal and said receiver, and
   a second set comprising at least one isolated pilot whose direct neighbor carriers in time/frequency space carry informative data elements enabling a local refining of said first estimation in taking account of a complex value associated with said isolated pilot after passage through said transmission channel, wherein said local refining implements a comparison of an imaginary interference term affecting said isolated pilot to a local correction of said first estimation as a function of the result of said comparison.

13. Computer program product stored on a non-transitory computer-readable medium and executable by a processor, wherein the product comprises program code instructions for implementing a method for sending a multicarrier signal formed by a temporal succession of symbols formed by a set of real-value data elements comprising:
   informative data elements, and
   for at least certain of said symbols, reference data elements called pilots whose value and location at transmission are known to at least one receiver designed to make a reception of said multicarrier signal,
each of said data elements modulating a carrier frequency of said signal, a carrier frequency modulated by one of said data elements being called a carrier, wherein the method implements at least two sets of data elements among said set of data elements, including:
   a first set comprising a preamble formed by at least one symbol constituted by pilots, used to determine a first estimation of a transmission channel between a sender designed to send said multicarrier signal and said receiver, and
   a second set comprising at least one isolated pilot whose direct neighbor carriers in time/frequency space carry informative data elements enabling a local refining of said first estimation in taking account of a complex value associated with said isolated pilot after passage through said transmission channel, wherein said local refining implements a comparison of an imaginary interference term affecting said isolated pilot to a local correction of said first estimation as a function of the result of said comparison, and
wherein the method further comprises transmitting the multicarrier signal by the sender.

14. A computer program product stored on a non-transitory computer-readable medium and executable by a processor, wherein the product comprises program code instructions for implementing a method for sending a multicarrier signal formed by a temporal succession of symbols constituted by a set of real-value data elements comprising:
   informative data elements, and
   for at least certain of said symbols, reference data elements called pilots whose value and location at transmission are known to at least one receiver designed to make a reception of said multicarrier signal,
each of said data elements modulating a carrier frequency of said signal, a carrier frequency modulated by one of said data elements being called a carrier, wherein the method implements at least two sets of data elements among said set of data elements, including:
   a first set comprising at least one pair of pilots, used to determine a first estimation of a transmission channel between a sender designed to send said multicarrier signal and said receiver, and
   a second set comprising at least one isolated pilot whose direct neighbor carriers in time/frequency space carry informative data elements enabling a local refining of said first estimation in taking account of a complex value associated with said isolated pilot after passage through said transmission channel, wherein said local refining implements a comparison of an imaginary interference term affecting said isolated pilot to a local correction of said first estimation as a function of the result of said comparison, and
wherein the method further comprises transmitting the multicarrier signal by the sender.

* * * * *